United States Patent
Ota

(10) Patent No.: US 12,222,727 B2
(45) Date of Patent: Feb. 11, 2025

(54) ROBOT CONTROL DEVICE, ROBOT CONTROL METHOD, AND LEARNING MODEL GENERATION DEVICE

(71) Applicant: Mitsubishi Electric Corporation, Tokyo (JP)

(72) Inventor: Kei Ota, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 307 days.

(21) Appl. No.: 17/836,542

(22) Filed: Jun. 9, 2022

(65) Prior Publication Data
US 2022/0300005 A1 Sep. 22, 2022

Related U.S. Application Data

(63) Continuation of application No. PCT/JP2020/008096, filed on Feb. 27, 2020.

(51) Int. Cl.
*G05D 1/00* (2024.01)
(52) U.S. Cl.
CPC ......... *G05D 1/0221* (2013.01); *G05D 1/0214* (2013.01)
(58) Field of Classification Search
CPC ..... G05D 1/0221; G05D 1/0214; G01C 21/00
See application file for complete search history.

(56) References Cited

U.S. PATENT DOCUMENTS 5,532,929 A * 7/1996 Hattori .................... F02D 41/26
706/905
9,008,806 B2 * 4/2015 De Groot ............. H05B 47/175
340/541
11,993,287 B2 * 5/2024 Vogt ...................... G05D 1/0291
2005/0285445 A1 * 12/2005 Wruck .................... H02J 9/002
307/10.1
2009/0326710 A1 * 12/2009 Iba ........................ B25J 19/023
901/4

(Continued)

FOREIGN PATENT DOCUMENTS

JP 2007-317165 A 12/2007
JP 2007316799 A * 12/2007

(Continued)

OTHER PUBLICATIONS

Prior art from applicant IDS JP2007316799 used for rejection of claims (Year: 2007).*

(Continued)

*Primary Examiner* — Bhavesh V Amin
(74) *Attorney, Agent, or Firm* — Birch, Stewart, Kolasch & Birch, LLP

(57) ABSTRACT

A robot control device is configured to include: a moving route acquiring unit to acquire a moving route of a robot from a first learning model by giving, to the first learning model, observation data indicating a position of an obstacle being present in a region where the robot moves and state data indicating a moving state of the robot at a movement start point at which the robot starts moving among moving states of the robot in the region where the robot moves; and a control value generating unit to generate a control value for the robot, the control value for allowing the robot to move along the moving route acquired by the moving route acquiring unit.

5 Claims, 7 Drawing Sheets

(56) References Cited

U.S. PATENT DOCUMENTS

| | | | |
|---|---|---|---|
| 2014/0075004 A1* | 3/2014 | Van Dusen | G07C 13/00 709/223 |
| 2018/0079076 A1 | 3/2018 | Toda | |
| 2018/0147665 A1 | 5/2018 | Furuya | |
| 2018/0274668 A1* | 9/2018 | Gray | F16H 61/0213 |
| 2018/0281809 A1* | 10/2018 | Tochioka | B60W 40/09 |
| 2018/0348374 A1* | 12/2018 | Laddha | G01S 17/931 |
| 2019/0012909 A1* | 1/2019 | Mintz | G06Q 30/0206 |
| 2019/0113351 A1* | 4/2019 | Antony | B60W 30/18145 |
| 2019/0156249 A1* | 5/2019 | Nakata | G06N 20/00 |
| 2019/0212749 A1* | 7/2019 | Chen | B62D 15/025 |
| 2019/0215660 A1* | 7/2019 | Slushtz | G01S 5/0027 |
| 2019/0219998 A1* | 7/2019 | Harihara Subramanian | G09G 5/00 |
| 2019/0340924 A1* | 11/2019 | Abari | G06V 20/58 |
| 2019/0383627 A1* | 12/2019 | Nangeroni | B60W 50/0098 |
| 2020/0050997 A1* | 2/2020 | Fox | G06F 18/214 |
| 2020/0117900 A1* | 4/2020 | Deng | H04L 67/52 |
| 2020/0126126 A1* | 4/2020 | Briancon | G06N 20/20 |
| 2020/0151899 A1* | 5/2020 | Suzuki | G06N 3/045 |
| 2020/0353822 A1* | 11/2020 | Romanov | A47L 11/4061 |
| 2022/0083067 A1* | 3/2022 | Yoshida | G05D 1/0094 |
| 2022/0160919 A1* | 5/2022 | Yoon | G05D 1/0221 |

FOREIGN PATENT DOCUMENTS

| | | |
|---|---|---|
| JP | 2009-175932 A | 8/2009 |
| JP | 2018-43338 A | 3/2018 |
| JP | 2018-86711 A | 6/2018 |

OTHER PUBLICATIONS

International Search Report for PCT/JP2020/008096 mailed on May 26, 2020.

Written Opinion of the International Searching Authority for PCT/JP2020/008096 (PCT/ISA/237) mailed on May 26, 2020.

* cited by examiner

ROBOT CONTROL DEVICE, ROBOT CONTROL METHOD, AND LEARNING MODEL GENERATION DEVICE

CROSS REFERENCE TO RELATED APPLICATIONS

This application is a Continuation of PCT International Application No. PCT/JP2020/008096, filed on Feb. 27, 2020, all of which is hereby expressly incorporated by reference into the present application.

TECHNICAL FIELD

The present disclosure relates to a robot control device and a robot control method for each generating a control value for a robot, and a learning model generation device for generating a learning model.

BACKGROUND ART

In recent years, robots that autonomously travel (hereinafter, referred to as "autonomous traveling type robots") have been developed. In some cases, the autonomous traveling type robot is required to move without colliding with an obstacle being present in the surrounding environment. As for a robot control device that generates a control value for a robot, it is desired to develop a control device capable of moving the robot without colliding with an obstacle in each of various environments where obstacles are present, in other words, in each of the plurality of environments where kinds and positions of the obstacles are different from each other.

Meanwhile, Patent Literature 1 below discloses a machine learning device that learns an operation program for operating an arm of a robot, so-called arm-type robot, in such a way that the arm does not hit peripheral equipment or the like in a certain single environment in which some equipment or the like is present around the robot.

CITATION LIST

Patent Literatures

Patent Literature 1: JP 2018-43338 A

SUMMARY OF INVENTION

Technical Problem

If the machine learning device disclosed in Patent Literature 1 can be used for the autonomous traveling type robot as described above, there is a possibility that an operation program capable of moving the robot without colliding with an obstacle can be learned.

However, the machine learning device learns an operation program for operating the arm in a certain single environment, and does not guarantee that the arm does not hit peripheral equipment or the like when the arm is operated in another environment different from the certain single environment. For this reason, when the robot that moves in accordance with the operation program learned by the machine learning device moves in another region, there has been a problem that the robot may collide with an obstacle.

The present disclosure has been made to solve the above problem, and an object of the present disclosure is to provide a robot control device and a robot control method each capable of moving a robot without colliding with an obstacle in a region where a position of the obstacle or the like is different from a known region where an obstacle is present.

Solution to Problem

A robot control device according to the present disclosure includes: moving route acquiring circuitry to acquire a moving route of a robot from a first learning model by giving, to the first learning model, observation data indicating a position of an obstacle being present in a region where the robot moves and state data indicating a moving state of the robot at a movement start point where the robot starts moving among moving states of the robot in the region where the robot moves; and control value generating circuitry to generate at least one control value for the robot, the control value for allowing the robot to move along the moving route acquired by the moving route acquiring circuitry, in which the control value generating circuitry gives, to a second learning model, state data indicating a moving state of the robot when the robot is moving in the region and the moving route acquired by the moving route acquiring circuitry, and acquires the control value for the robot from the second learning model.

Advantageous Effects of Invention

According to the present disclosure, it is possible to move a robot without colliding with an obstacle in a region where a position of the obstacle or the like is different from a known region where an obstacle is present.

BRIEF DESCRIPTION OF DRAWINGS

FIG. 3 is a hardware configuration diagram of a computer when the learning model generation device 1 is implemented by software, firmware, or the like.

FIG. 6 is a hardware configuration diagram of a computer when the learning model generation device 5 is implemented by software, firmware, or the like.

FIG. 10 is a hardware configuration diagram of a computer when the robot control device 11 is implemented by software, firmware, or the like.

DESCRIPTION OF EMBODIMENTS

In order to explain the present disclosure in more detail, a mode for carrying out the present disclosure will be described below with reference to the accompanying drawings.

First Embodiment

Figure 1:
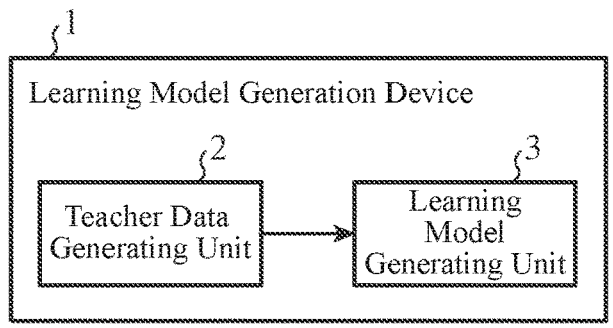
FIG. 1 is a configuration diagram illustrating a learning model generation device 1 according to a first embodiment.
Figure 2:
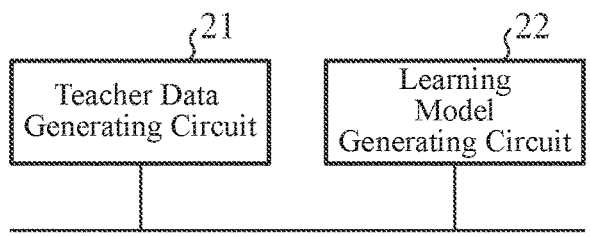
FIG. 2 is a hardware configuration diagram illustrating hardware of the learning model generation device 1 according to the first embodiment.

FIG. 1 is a configuration diagram illustrating a learning model generation device 1 according to a first embodiment. FIG. 2 is a hardware configuration diagram illustrating hardware of the learning model generation device 1 according to the first embodiment.

In FIG. 1, the learning model generation device 1 includes a teacher data generating unit 2 and a learning model generating unit 3.

The teacher data generating unit 2 is implemented by, for example, a teacher data generating circuit 21 illustrated in FIG. 2.

The teacher data generating unit 2 generates teacher data $y_i$ (i=1, ..., I) indicating a route along which a robot can move in each of I (I is an integer of equal to or more than 2) regions without colliding with an obstacle being present in each of the regions. The obstacle being presenting in each of the I regions has a different shape, size, or position.

The teacher data generating unit 2 outputs the generated teacher data $y_i$ to the learning model generating unit 3.

The learning model generating unit 3 is implemented by, for example, a learning model generating circuit 22 illustrated in FIG. 2.

The learning model generating unit 3 acquires observation data $d_{ob,i}$ (i=1, ..., I) indicating a position of the obstacle being present in each of the I regions, and state data $d_{s,i,0}$ indicating a moving state of the robot at a movement start point at which the robot starts moving among the moving states of the robot in each of the regions. The moving state of the robot is a position of the robot, a speed of the robot, an acceleration of the robot, or the like.

In addition, the learning model generating unit 3 acquires the teacher data $y_i$ generated by the teacher data generating unit 2.

The learning model generating unit 3 generates a first learning model 4 (see FIG. 8) that has learned a moving route of the robot by using the observation data $d_{ob,i}$, the state data $d_{s,i,0}$, and the teacher data $y_i$.

The first learning model 4 is implemented by, for example, a neural network.

When observation data $d_{ob}$ indicating a position of the obstacle being present in a region where the robot moves, and state data $d_{s,0}$ indicating a moving state of the robot at a movement start point at which the robot starts moving among the moving states of the robot in the region where the robot moves are given, the first learning model 4 outputs route data indicating a moving route of the robot.

In FIG. 1, it is assumed that each of the teacher data generating unit 2 and the learning model generating unit 3 which are components of the learning model generation device 1 is implemented by dedicated hardware as illustrated in FIG. 2. That is, it is assumed that the learning model generation device 1 is implemented by the teacher data generating circuit 21 and the learning model generating circuit 22.

Each of the teacher data generating circuit 21 and the learning model generating circuit 22 corresponds to, for example, a single circuit, a composite circuit, a programmed processor, a parallel programmed processor, an application specific integrated circuit (ASIC), a field-programmable gate array (FPGA), or a combination thereof.

The components of the learning model generation device 1 are not limited to those implemented by dedicated hardware, and the learning model generation device 1 may be implemented by software, firmware, or a combination of software and firmware.

The software or firmware is stored in a memory of a computer, as a program. The computer means hardware that executes a program, and corresponds to, for example, a central processing unit (CPU), a central processing unit, a processing unit, an arithmetic unit, a microprocessor, a microcomputer, a processor, or a digital signal processor (DSP).

Figure 3:
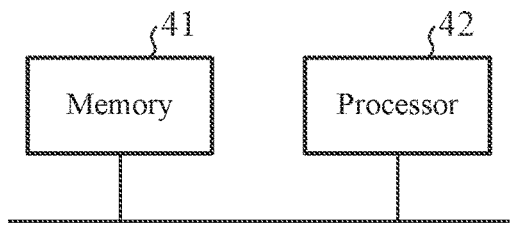

FIG. 3 is a hardware configuration diagram of a computer when the learning model generation device 1 is implemented by software, firmware, or the like.

When the learning model generation device 1 is implemented by software, firmware, or the like, a program for causing a computer to execute each of processing procedures performed in the teacher data generating unit 2 and the learning model generating unit 3 is stored in the memory 41. Then, the processor 42 of the computer executes the program stored in the memory 41.

In addition, FIG. 2 illustrates an example in which each of the components of the learning model generation device 1 is implemented by dedicated hardware, and FIG. 3 illustrates an example in which the learning model generation device 1 is implemented by software, firmware, or the like. However, these are merely examples, and one of the components in the learning model generation device 1 may be implemented by dedicated hardware, and the remaining component may be implemented by software, firmware, or the like.

Figure 4:
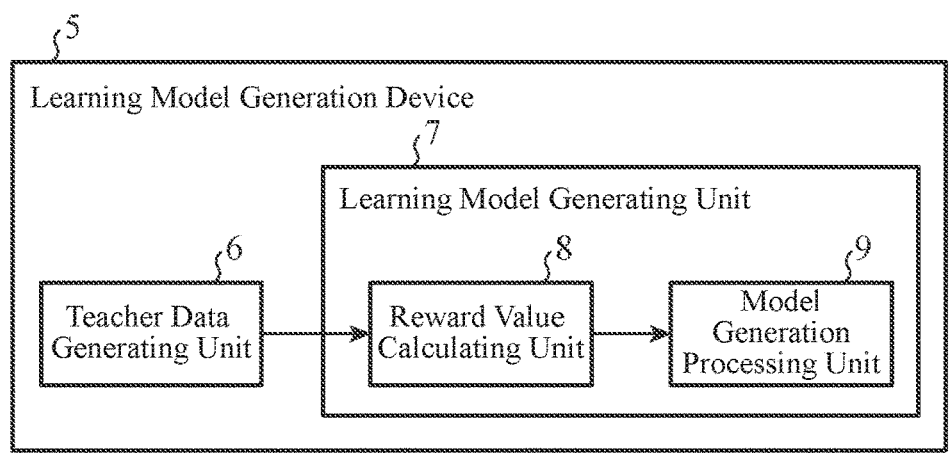
FIG. 4 is a configuration diagram illustrating a learning model generation device 5 according to the first embodiment.
Figure 5:
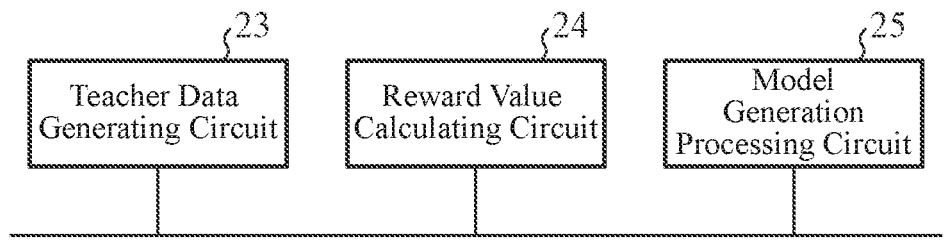
FIG. 5 is a hardware configuration diagram illustrating hardware of the learning model generation device 5 according to the first embodiment.

FIG. 4 is a configuration diagram illustrating the learning model generation device 5 according to the first embodiment. FIG. 5 is a hardware configuration diagram illustrating hardware of the learning model generation device 5 according to the first embodiment.

In FIG. 4, the learning model generation device 5 includes a teacher data generating unit 6 and a learning model generating unit 7.

The teacher data generating unit 6 is implemented by, for example, a teacher data generating circuit 23 illustrated in FIG. 5.

Similarly to the teacher data generating unit 2 illustrated in FIG. 1, the teacher data generating unit 6 generates teacher data $y_i$ (i=1, ..., I) indicating a route along which the robot can move in each of the I regions without colliding with an obstacle being present in each of the regions.

The teacher data generating unit 6 outputs the generated teacher data $y_i$ to the learning model generating unit 7.

The learning model generating unit 7 includes a reward value calculating unit 8 and a model generation processing unit 9.

The learning model generating unit 7 generates a second learning model 10 (see FIG. 8) that has learned a control value at for the robot using both a state data $d_{s,i,t}$ indicating a moving state of the robot when the robot is moving in each of the regions and the teacher data $y_i$ generated by the teacher data generating unit 6. "t" indicates a control processing time at which the robot control device 11 illustrated in FIG. 8 described later controls the movement of the robot.

The reward value calculating unit 8 is implemented by, for example, a reward value calculating circuit 24 illustrated in FIG. 5.

The reward value calculating unit 8 acquires the state data $d_{s,i,t}$ indicating the moving state of the robot when the robot is moving in each of the regions, and the teacher data $y_i$ generated by the teacher data generating unit 6.

Using a reward function including the state data $d_{s,i,t}$ and the teacher data $y_i$ as reward terms, the reward value calculating unit 8 calculates reward values $R_t$ at a plurality of respective control processing times t at each of which the movement of the robot is controlled, from a movement start point at which the robot starts moving to a movement end point at which the robot ends the movement.

The reward value calculating unit 8 outputs the reward values $R_t$ at the respective control processing times t to the model generation processing unit 9.

The model generation processing unit 9 is implemented by, for example, a model generation processing circuit 25 illustrated in FIG. 5.

The model generation processing unit 9 generates the second learning model 10 that has learned the control value at for the robot by using an expected value J of a cumulative sum of the reward values $R_t$ at the respective control processing times t calculated by the reward value calculating unit 8.

The second learning model 10 is implemented by, for example, a neural network.

When state data $d_{s,t}$ indicating a moving state of the robot when the robot is moving in a certain region and a route data indicating a moving route of the robot are given, the second learning model 10 outputs the control value at for the robot at each of the control processing times t.

In FIG. 4, it is assumed that each of the teacher data generating unit 6, the reward value calculating unit 8, and the model generation processing unit 9 which are components of the learning model generation device 5 is implemented by dedicated hardware as illustrated in FIG. 5. That is, it is assumed that the learning model generation device 5 is implemented by the teacher data generating circuit 23, the reward value calculating circuit 24, and the model generation processing circuit 25.

Each of the teacher data generating circuit 23, the reward value calculating circuit 24, and the model generation processing circuit 25 corresponds to, for example, a single circuit, a composite circuit, a programmed processor, a parallel-programmed processor, ASIC, FPGA, or a combination thereof.

The components of the learning model generation device 5 are not limited to those implemented by dedicated hardware, but the learning model generation device 5 may be implemented by software, firmware, or a combination of software and firmware.

Figure 6:
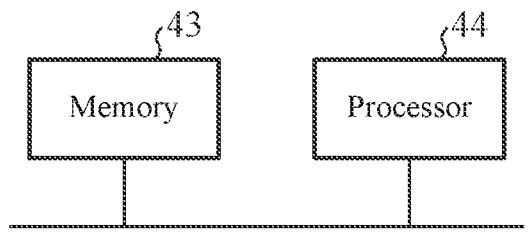

FIG. 6 is a hardware configuration diagram of a computer when the learning model generation device 5 is implemented by software, firmware, or the like.

When the learning model generation device 5 is implemented by software, firmware, or the like, a program for causing a computer to execute each of the processing procedures performed in the teacher data generating unit 6, the reward value calculating unit 8, and the model generation processing unit 9 is stored in the memory 43. Then, a processor 44 of the computer executes the program stored in the memory 43.

In addition, FIG. 5 illustrates an example in which each of the components of the learning model generation device 5 is implemented by dedicated hardware, and FIG. 6 illustrates an example in which the learning model generation device 5 is implemented by software, firmware, or the like. However, these are merely examples, and at least one of the components in the learning model generation device 5 may be implemented by dedicated hardware, and the remaining components may be implemented by software, firmware, or the like.

Here, the learning model generating unit 3 illustrated in FIG. 1 generates the first learning model 4, and the learning model generating unit 7 illustrated in FIG. 4 generates the second learning model 10. However, this is merely an example, and for example, as illustrated in FIG. 7, a learning model generating unit 3' may include the learning model generating unit 3 illustrated in FIG. 1 and the learning model generating unit 7 illustrated in FIG. 4, and the learning model generating unit 3' may generate each of the first learning model 4 and the second learning model 10.

Figure 7:
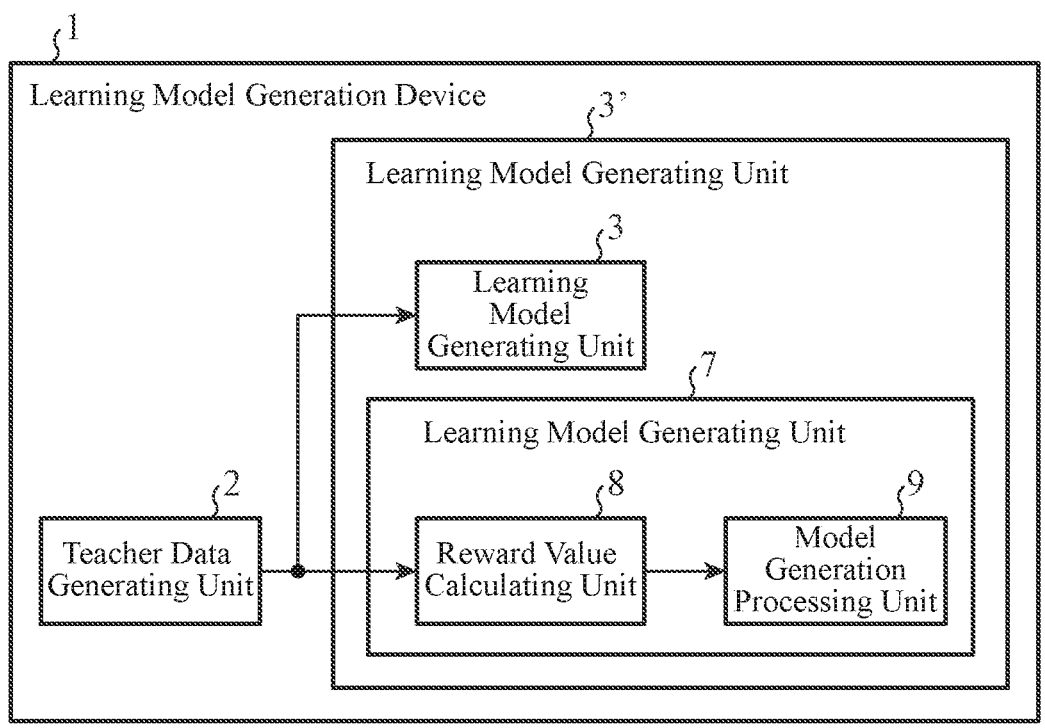
FIG. 7 is a configuration diagram illustrating another learning model generation device 1 according to the first embodiment.

FIG. 7 is a configuration diagram illustrating another learning model generation device 1 according to the first embodiment.

When the learning model generating unit 3' generates each of the first learning model 4 and the second learning model 10, the route data output from the first learning model 4 may be used as the teacher data $y_i$ used for calculation of the reward values $R_t$ by the reward value calculating unit 8 of the learning model generating unit 7, instead of the teacher data $y_i$ generated by the teacher data generating unit 6. When the reward value calculating unit 8 uses the route data output from the first learning model 4, the first learning model 4 and the second learning model 10 can be associated with each other. Therefore, when the learning model generating unit 7 uses the route data output from the first learning model 4, instead of the teacher data $y_i$ generated by the teacher data generating unit 6, the generation accuracy of the second learning model 10 can be improved as compared with the case of using the teacher data $y_i$ generated by the teacher data generating unit 6.

Figure 8:
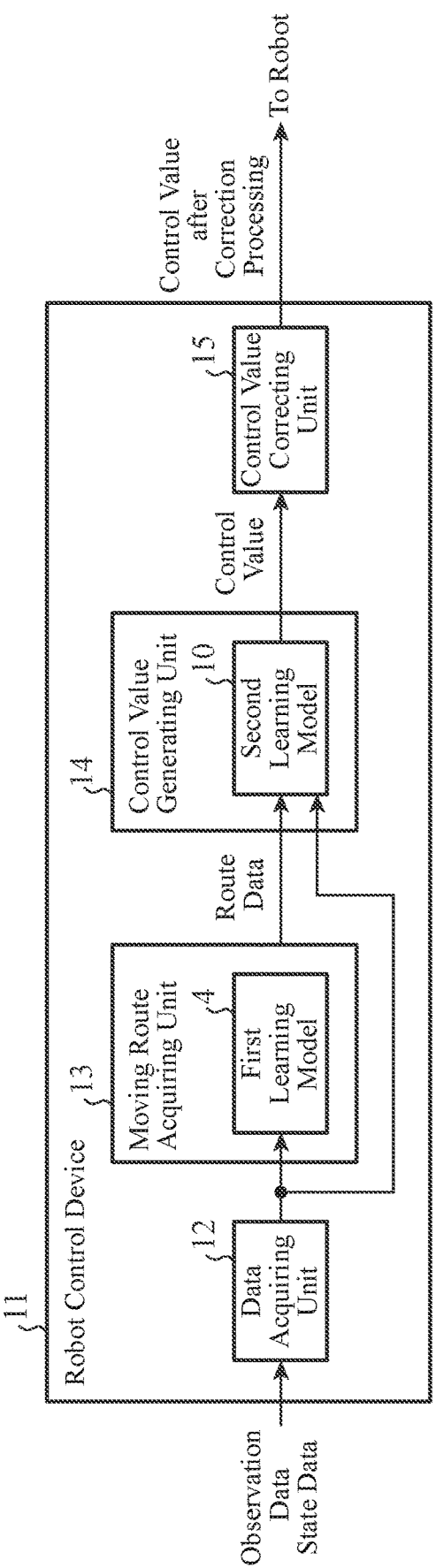
FIG. 8 is a configuration diagram illustrating a robot control device 11 according to the first embodiment.
Figure 9:
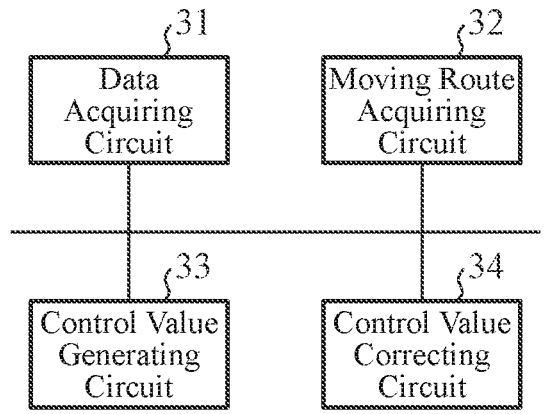
FIG. 9 is a hardware configuration diagram illustrating hardware of the robot control device 11 according to the first embodiment.

FIG. 8 is a configuration diagram illustrating the robot control device 11 according to the first embodiment. FIG. 9 is a hardware configuration diagram illustrating hardware of the robot control device 11 according to the first embodiment.

In FIG. 8, the robot control device 11 includes a data acquiring unit 12, a moving route acquiring unit 13, a control value generating unit 14, and a control value correcting unit 15.

The data acquiring unit 12 is implemented by, for example, a data acquiring circuit 31 illustrated in FIG. 9.

The data acquiring unit 12 acquires the observation data $d_{ob}$ indicating the position of the obstacle being present in the region where the robot moves and the state data $d_{s,0}$ indicating the moving state of the robot at the movement start point where the robot starts moving among the moving states of the robot in the region where the robot moves.

In addition, the data acquiring unit 12 acquires the state data $d_{s,t}$ indicating a moving state of the robot when the robot is moving in the region.

The data acquiring unit 12 outputs each of the observation data $d_{ob}$ and the state data $d_{s,0}$ to the moving route acquiring unit 13.

The data acquiring unit 12 outputs the state data $d_{s,t}$ to the control value generating unit 14.

The moving route acquiring unit 13 is implemented by, for example, a moving route acquiring circuit 32 illustrated in FIG. 9.

The moving route acquiring unit 13 has the first learning model 4 generated by the learning model generating unit 3 of the learning model generation device 1.

The moving route acquiring unit 13 gives, to the first learning model 4, the observation data $d_{ob}$ acquired by the data acquiring unit 12 and the state data $d_{s,0}$ indicating the moving state of the robot at the movement start point acquired by the data acquiring unit 12, and acquires the moving route of the robot from the first learning model 4.

The moving route acquiring unit 13 outputs route data indicating the moving route of the robot to the control value generating unit 14.

The control value generating unit 14 is implemented by, for example, a control value generating circuit 33 illustrated in FIG. 9.

The control value generating unit 14 generates the control value at for the robot, the control value for allowing the robot to move along the moving route acquired by the moving route acquiring unit 13.

That is, the control value generating unit 14 has the second learning model 10 generated by the learning model generating unit 7 of the learning model generation device 5.

The control value generating unit 14 gives, to the second learning model 10, the state data $d_{s,t}$ indicating the moving state of the robot when the robot is moving in the region and the route data indicating the moving route of the robot, and acquires the control value at for the robot from the second learning model 10.

The control value at for the robot includes a plurality of control values. Examples of the control value at for the robot include a control value $a_{t,d}$ related to the moving direction of the robot, a control value $a_{t,v}$ related to the speed of the robot, and a control value $a_{t,a}$ related to the acceleration of the robot.

The control value generating unit 14 outputs the control value at for the robot to the control value correcting unit 15.

The control value correcting unit 15 is implemented by, for example, a control value correcting circuit 34 illustrated in FIG. 9.

When the control value $a_{t,v}$ related to the speed of the robot among the control values at of the robot generated by the control value generating unit 14 is larger than a speed threshold Thy, the control value correcting unit 15 changes the control value $a_{t,v}$ related to the speed of the robot to equal to or less than the speed threshold Thy.

When the control value $a_{t,a}$ related to the acceleration of the robot among the control values at of the robot generated by the control value generating unit 14 is larger than an acceleration threshold value $Th_a$, the control value correcting unit 15 changes the control value $a_{t,a}$ related to the acceleration of the robot to equal to or less than the acceleration threshold $Th_a$.

Each of the speed threshold $Th_v$ and the acceleration threshold $Th_a$ may be stored in an internal memory of the control value correcting unit 15 or may be given from the outside of the robot control device 11.

In FIG. 8, it is assumed that each of the data acquiring unit 12, the moving route acquiring unit 13, the control value generating unit 14, and the control value correcting unit 15 which are components of the robot control device 11 is implemented by dedicated hardware as illustrated in FIG. 9. That is, it is assumed that the robot control device 11 is implemented by the data acquiring circuit 31, the moving route acquiring circuit 32, the control value generating circuit 33, and the control value correcting circuit 34.

Each of the data acquiring circuit 31, the moving route acquiring circuit 32, the control value generating circuit 33, and the control value correcting circuit 34 corresponds to, for example, a single circuit, a composite circuit, a programmed processor, a parallel-programmed processor, ASIC, FPGA, or a combination thereof.

The components of the robot control device 11 are not limited to those implemented by dedicated hardware, and the robot control device 11 may be implemented by software, firmware, or a combination of software and firmware.

Figure 10:
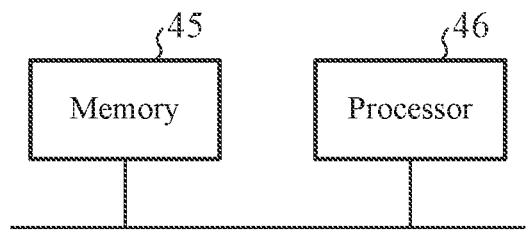

FIG. 10 is a hardware configuration diagram of a computer when the robot control device 11 is implemented by software, firmware, or the like.

When the robot control device 11 is implemented by software, firmware, or the like, a program for causing a computer to execute each of the processing procedures performed in the data acquiring unit 12, the moving route acquiring unit 13, the control value generating unit 14, and the control value correcting unit 15 is stored in a memory 45. Then, a processor 46 of the computer executes the program stored in the memory 45.

Furthermore, FIG. 9 illustrates an example in which each of the components of the robot control device 11 is implemented by dedicated hardware, and FIG. 10 illustrates an example in which the robot control device 11 is implemented by software, firmware, or the like. However, these are merely examples, and some components in the robot control device 11 may be implemented by dedicated hardware, and the remaining components may be implemented by software, firmware, or the like.

Next, the operation of the learning model generation device 1 illustrated in FIG. 1 will be described.

Figure 11:
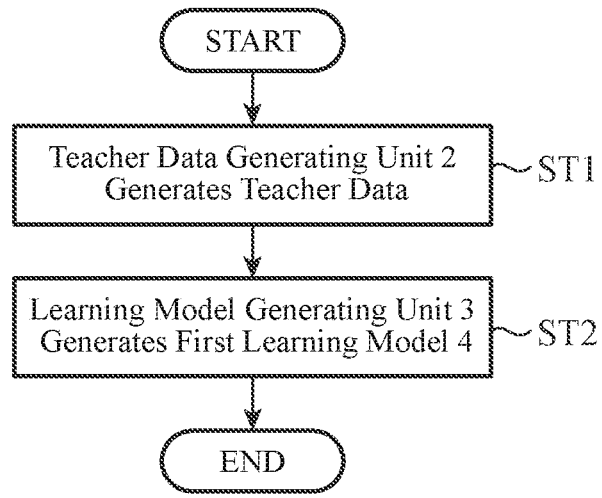
FIG. 11 is a flowchart illustrating a processing procedure performed in the learning model generation device 1 illustrated in FIG. 1.

FIG. 11 is a flowchart illustrating a processing procedure performed in the learning model generation device 1 illustrated in FIG. 1.

FIGS. 12A, 12B, 12C, and 12D are explanatory diagrams each illustrating a region where obstacles are present.

Figures 12A, 12B:
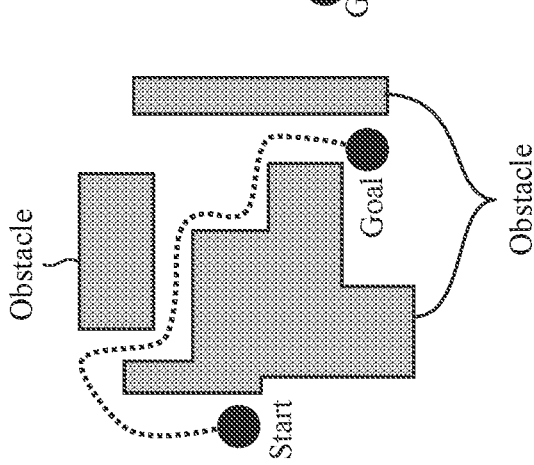
FIGS. 12A, 12B, 12C, and 12D are explanatory diagrams each illustrating a region where obstacles are present.
Figure 12C:
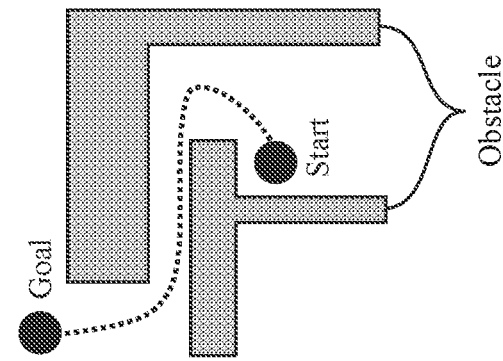

The shapes of the obstacles being present in a region illustrated in each of FIGS. 12A, 12B, and 12C are different from each other. In addition, the sizes of the obstacles being present in the region illustrated in each of the figures are different from each other. In addition, the positions of the obstacles being present in the region illustrated in each of the figures are different from each other.

Figure 12D:
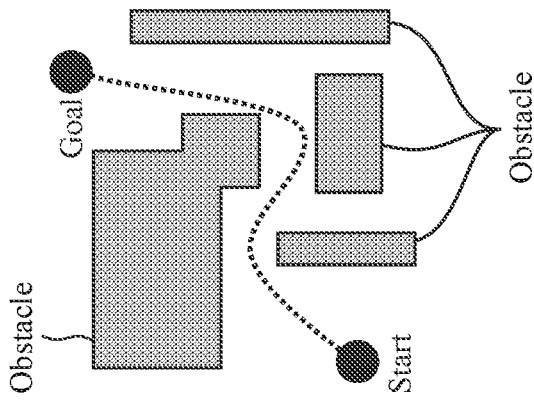

The region shown in FIG. 12C and the region shown in FIG. 12D are the same regions, but the movement start points and the movement end points of the robot are different.

In FIGS. 12A, 12B, 12C, and 12D, Start indicates a movement start point of the robot, and Goal indicates a movement end point of the robot. The broken line indicates a learning route along which the robot can move without colliding with an obstacle.

The teacher data generating unit 2 generates teacher data $y_i$ indicating a route along which the robot can move in each of the I (I is an integer of equal to or more than 2) regions without colliding with an obstacle being present in each of the regions (step ST1 in FIG. 11).

Even when a plurality of regions in each of which an obstacle is present are the same regions, if the movement start points Start and the movement end points Goal of the robot are different, for example, as illustrated in FIGS. 12C and 12D, the teacher data generating unit 2 determines that the regions are different regions and generates the teacher data $y_i$ for each of the regions.

The teacher data generating unit 2 can generate the teacher data indicating the learning route, by executing a route generation algorithm, using the observation data $d_{ob,i}$ (i=1, . . . , I) indicating the position of the obstacle being present in each of the I regions and the state data $d_{s,i,t}$ indicating the moving state of the robot when the robot is moving in each of the regions. As for the route generation algorithm, RRT* (Rapidly exploring Random Tree star), A* (A-star), Dijkstra's algorithm, or the like can be used.

Here, the teacher data generating unit 2 generates the teacher data $y_i$ indicating the learning route by executing the route generation algorithm. However, this is merely an example, and for example, the teacher data generating unit 2 may generate the teacher data $y_i$ as follows.

The teacher data generating unit 2 acquires information indicating a region occupied by an obstacle in each of the regions. Then, the teacher data generating unit 2 calculates, as the teacher data $y_i$, a route along which the robot can move in each of the regions without colliding with the obstacle, from the information by computer simulation.

The position of the obstacle is observed by a distance image sensor such as a depth sensor, light detection and ranging (LiDAR), a millimeter wave laser, or the like. The state data indicating the moving state of the robot is measured by a sensor or the like mounted on the robot.

Because the execution of the route generation algorithm requires a lot of time, it is difficult to execute the route generation algorithm when controlling the movement of the robot in real time. Therefore, before the movement of the robot is controlled in real time by the robot control device 11 illustrated in FIG. 8, the teacher data generating unit 2 generates the learning route and outputs the teacher data $y_i$ indicating the learning route to the learning model generating unit 3.

The learning model generating unit 3 acquires the observation data $d_{ob,i}$ (i=1, . . . , I) indicating the position of the obstacle being present in each of the I regions from the distance image sensor or the like.

In addition, the learning model generating unit 3 acquires, from a sensor or the like mounted on the robot, the state data $d_{s,i,0}$ indicating the moving state of the robot at the movement start point Start at which the robot starts moving among the moving states of the robot in each of the regions.

In addition, the learning model generating unit 3 acquires the teacher data $y_i$ for each of the regions, from the teacher data generating unit 2.

The learning model generating unit 3 generates the first learning model 4 that has learned the moving route of the robot using the acquired observation data $d_{ob,i}$, the acquired state data $d_{s,i,0}$, and the acquired teacher data $y_i$ (step ST2 in FIG. 11).

When the observation data $d_{ob}$ indicating the position of the obstacle being present in the region where the robot moves, and the state data $d_{s,0}$ indicating the moving state of the robot at the movement start point where the robot starts moving among the moving states of the robot in the region where the robot moves are given, the first learning model 4 outputs the route data indicating the moving route of the robot.

The first learning model 4 generated by the learning model generating unit 3 is implemented in the moving route acquiring unit 13 of the robot control device 11 illustrated in FIG. 8.

Hereinafter, a generation example of the first learning model 4 by the learning model generating unit 3 will be specifically described.

The first learning model 4 generated by the learning model generating unit 3 is a function approximator $f_\theta(d_i)$ such as a neural network.

When the teacher data $y_i$ indicating the learning route and input data $d_i$ are given, the learning model generating unit 3 calculates an optimum parameter $\theta^*$ among parameters $\theta$ that the function approximator $f_\theta(d_i)$ can take, by solving a regression problem illustrated in the following Formula (1).

The regression problem shown in the Formula (1) can be solved, for example, by using a gradient descent method. The input data $d_i$ includes the observation data $d_{ob,i}$ indicating the position of the obstacle being present in the i-th region among the I regions, and the state data $d_{s,i,0}$ indicating the moving state of the robot at the movement start point Start at which the robot starts moving among the moving states of the robot in the i-th region.

$$\theta^* = \mathrm{argmax}_\theta \sum_i \|y_i - f_\theta(d_i)\|_2^2 \tag{1}$$

After calculating the optimum parameter $\theta^*$, the learning model generating unit 3 gives a learning model having the optimum parameter $\theta^*$, as the first learning model 4, to the moving route acquiring unit 13 illustrated in FIG. 8.

Next, the operation of the learning model generation device 5 illustrated in FIG. 4 will be described.

Figure 13:
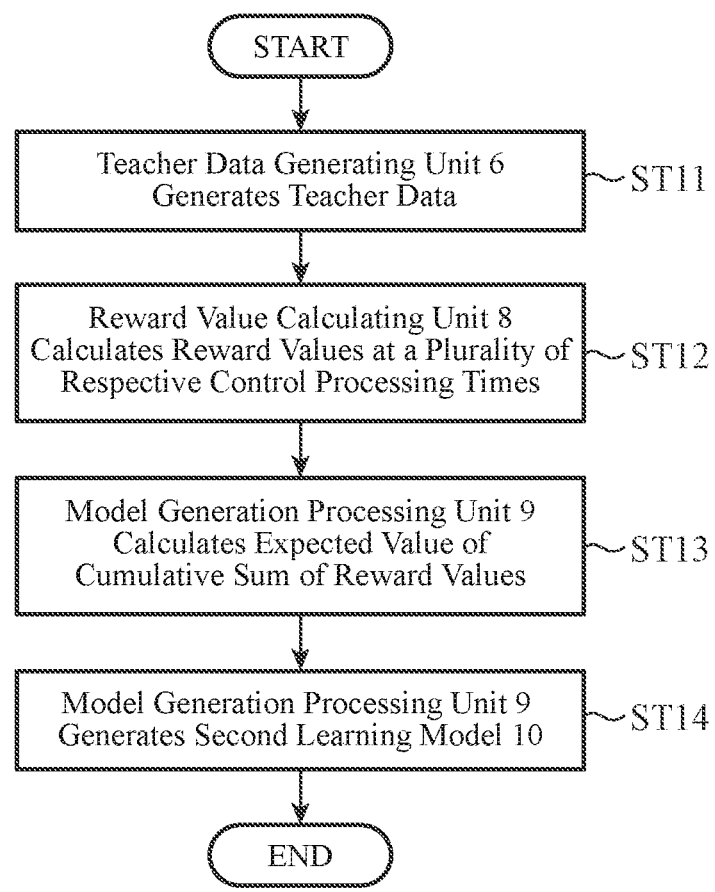
FIG. 13 is a flowchart illustrating a processing procedure performed in the learning model generation device 5 illustrated in FIG. 4.

FIG. 13 is a flowchart illustrating a processing procedure performed in the learning model generation device 5 illustrated in FIG. 4.

Similarly to the teacher data generating unit 2 illustrated in FIG. 1, the teacher data generating unit 6 generates teacher data $y_i$ indicating a route along which the robot can move in each of the I regions without colliding with an obstacle being present in each of the regions (step ST11 in FIG. 13).

The teacher data generating unit 6 generates the learning route before the movement of the robot is controlled in real time by the robot control device 11 illustrated in FIG. 8, and outputs the teacher data $y_i$ indicating the learning route to the learning model generating unit 7.

The reward value calculating unit 8 of the learning model generating unit 7 acquires the observation data $d_{ob,i}$ indicating the position of the obstacle being present in each of the I regions, the state data $d_{s,i,t}$ indicating the moving state of the robot when the robot is moving in each of the regions, and the teacher data $y_i$ generated by the teacher data generating unit 6.

The reward value calculating unit 8 calculates the reward values $R_t$ at the plurality of respective control processing times t at each of which the movement of the robot is controlled, using the reward function of Formula (2) including, as reward terms, the acquired observation data $d_{ob,i}$, the acquired state data $d_{s,i,t}$, and the acquired teacher data $y_i$ (step ST12 in FIG. 13).

$$R_t = w_2 \mathbb{I}_{collision} + w_2|\ddot{x}_t| + w_3 d_{reference} + w_4 n_{index} \tag{2}$$

In Formula (2), each of $w_1$, $w_2$, $w_3$, and $w_4$ is a weight.

The $\mathbb{I}_{collision}$ of the first term on the right side indicates a determination result indicating whether or not the robot collides with the obstacle at the control processing time t, and is a reward term obtained from each of the observation data $d_{ob,i}$ and the state data $d_{s,i,t}$.

$x_t$ dot (because of the electronic application, in the sentence of the specification, the symbol "••" cannot be attached above the letter x, and thus it is written as $x_t$ dot) of the second term on the right side indicates the acceleration of the robot at the control processing time t, and is a reward term obtained from the state data $d_{s,i,t}$. The second term on the right side acts as a penalty corresponding to the magnitude of the acceleration in such a wat that the robot operates smoothly.

Each of the $d_{reference}$ of the third term on the right side and the $n_{index}$ of the fourth term on the right side is a reward term obtained from a corresponding one of the teacher data $y_i$ and the state data $d_{s,i,t}$. The $d_{reference}$ refers to a distance from the route indicated by the teacher data $y_i$ to the robot, and if $w_3<0$, when the distance from the route indicated by the teacher data $y_i$ to the robot is short, a high reward value $R_t$ is calculated.

The $n_{index}$ indicates whether or not the robot is moving toward the movement end point Goal, and when the robot is moving toward the movement end point Goal, a high reward value $R_t$ is calculated.

A parameter φ that a function approximator being the second learning model 10 generated by the model generation processing unit 9 can take changes depending on the first to fourth terms on the right side of Formula (2).

The Formula (2) represents a reward function including $\Pi_{collision}$ of the first term on the right side as a reward term. Since the $\Pi_{collision}$ of the first term on the right side is obtained from each of the observation data $d_{ob,i}$ and the state data $d_{s,i,t}$, the reward value calculating unit 8 acquires the observation data $d_{ob,i}$. The reward value calculating unit 8 may calculate the reward value $R_t$ at the control processing time t, by using a reward function that does not include the $\Pi_{collision}$ of the first term on the right side. When the reward function that does not include the $\Pi_{collision}$ of the first term on the right side is used, the reward value calculating unit 8 does not need to acquire the observation data $d_{ob,i}$.

The reward value calculating unit 8 outputs the reward values $R_t$ at the respective control processing times t to the model generation processing unit 9.

Upon receiving the reward values $R_t$ at the respective control processing times t from the reward value calculating unit 8, the model generation processing unit 9 calculates an expected value J of a cumulative sum of the reward values $R_t$ at the respective control processing times t as expressed in the following Formula (3) (step ST13 in FIG. 13).

$$J = E_{\pi(a_t|s_t),p(s_{t+1}|s_t,a_t)}[\Sigma_{t=0}^{T-1} \gamma^t R_{t+1}] \qquad (3)$$

In Formula (3), at is the control value for the robot at the control processing time t.

γ is a discount rate of reinforcement learning performed when the model generation processing unit 9 generates the second learning model 10. Because the value of γ is generally 0<γ<1, the control value at for the robot is learned in such a way that the reward value $R_t$ in the far future decreases exponentially while the reward value $R_t$ in the near future is maximized.

T indicates the maximum number of steps at the control processing time t, and st indicates the current state.

$p(s_{t+1}|s_t, a_t)$ is a probability of transition to the next state. $E_{\pi(at|st), p (st+1|st, at)}[x]$ is an expected value of x.

The model generation processing unit 9 uses the expected value J of the cumulative sum of the reward values $R_t$, thereby generating the second learning model 10 that has learned the control value at for the robot (step ST14 in FIG. 13).

That is, the model generation processing unit 9 generates the second learning model 10, by learning the control value at for the robot at the control processing time t in such a way that the expected value J of the cumulative sum is maximized, as expressed in the following Formula (4).

$$\phi^* = \underset{\phi}{\mathrm{argmax}} J \qquad (4)$$

When the control value at for the robot at the control processing time t is learned in such a way that the expected value J of the cumulative sum is maximized, the parameter φ of the second learning model 10 is the optimum parameter φ*.

The model generation processing unit 9 gives the second learning model 10 having the optimum parameter φ* to the control value generating unit 14 illustrated in FIG. 8.

Next, the operation of the robot control device 11 illustrated in FIG. 8 will be described.

Figure 14:
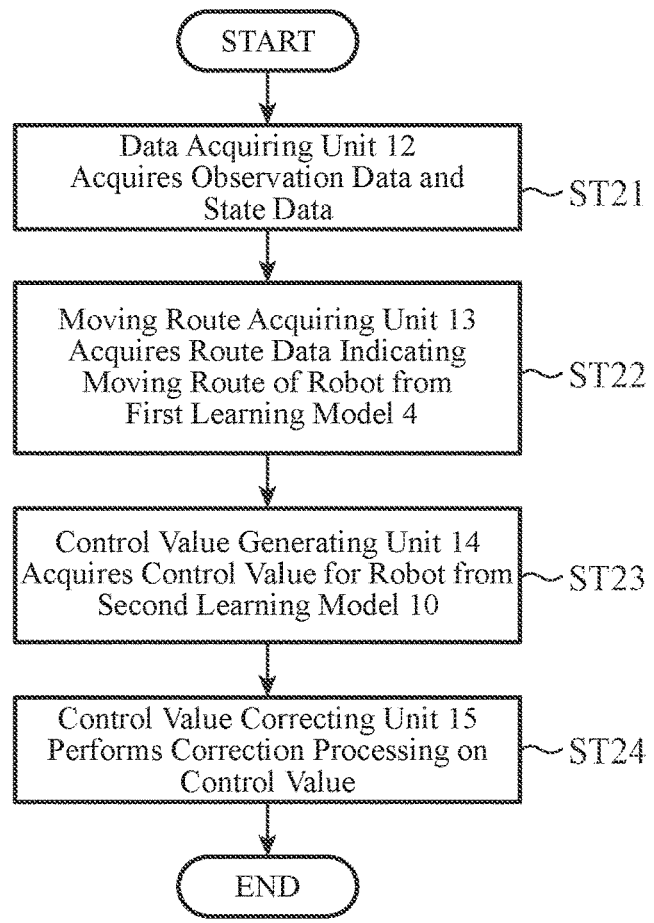
FIG. 14 is a flowchart illustrating a processing procedure performed in the robot control device 11 illustrated in FIG. 8.

FIG. 14 is a flowchart illustrating a processing procedure performed in the robot control device 11 illustrated in FIG. 8.

First, the data acquiring unit 12 acquires, from a distance image sensor or the like, the observation data $d_{ob}$ indicating the position of an obstacle being present in a region where the robot moves (step ST21 in FIG. 14).

The data acquiring unit 12 acquires, from a sensor or the like mounted on the robot, the state data $d_{s,0}$ indicating the moving state of the robot at the movement start point Start at which the robot starts moving among the moving states of the robot in the region where the robot moves (step ST21 in FIG. 14).

In addition, the data acquiring unit 12 acquires the state data $d_{s,t}$ indicating the moving state of the robot when the robot is moving in the region, from the sensor or the like mounted on the robot (step ST21 in FIG. 14).

The data acquiring unit 12 outputs each of the observation data $d_{ob}$ and the state data $d_{s,0}$ to the moving route acquiring unit 13.

The data acquiring unit 12 outputs the state data $d_{s,t}$ to the control value generating unit 14.

If the observation data $d_{ob,i}$ is used when the reward value calculating unit 8 of the learning model generating unit 7 calculates the reward value $R_t$, the data acquiring unit 12 also outputs the observation data $d_{ob}$ to the control value generating unit 14.

The moving route acquiring unit 13 has the first learning model 4 generated by the learning model generating unit 3 of the learning model generation device 1.

The moving route acquiring unit 13 acquires the route data indicating the moving route of the robot from the first learning model 4, by giving each of the observation data $d_{ob}$ and the state data $d_{s,0}$ output from the data acquiring unit 12 to the first learning model 4 (step ST22 in FIG. 14).

Figure 15:
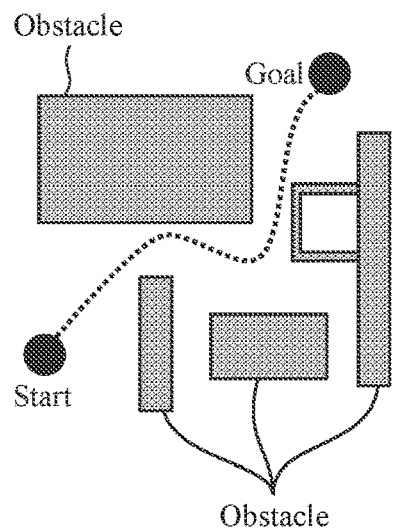
FIG. 15 is an explanatory diagram illustrating a moving route of a robot.

FIG. 15 is an explanatory diagram illustrating a moving route of the robot.

In FIG. 15, each "•" in the dotted line indicates each position $k_t$ of the robot on the moving route.

The route data is a set of coordinate data indicating each position $k_t$ of the robot on the moving route.

The moving route acquiring unit 13 outputs the route data to the control value generating unit 14.

The control value generating unit 14 has the second learning model 10 generated by the learning model generating unit 7 of the learning model generation device 5.

The control value generating unit 14 acquires the control values at for the robot at the respective control processing times t from the second learning model 10, by giving the state data $d_{s,t}$ output from the data acquiring unit 12 and the route data output from the moving route acquiring unit 13 to the second learning model 10 (step ST23 in FIG. 14).

If the observation data $d_{ob,i}$ is used when the reward value calculating unit 8 of the learning model generating unit 7 calculates the reward value $R_t$, the control value generating unit 14 also gives the observation data $d_{ob}$ to the second learning model 10.

The control value at for the robot includes, for example, the control value $a_{t,d}$ related to the moving direction of the robot, the control value $a_{t,v}$ related to the speed of the robot, or the control value $a_{t,a}$ related to the acceleration of the robot.

The control value generating unit 14 outputs the control values at for the robot at the respective control processing times t to the control value correcting unit 15.

Upon receiving the control values at for the robot at the respective control processing times t from the control value generating unit 14, the control value correcting unit 15 performs correction processing on the control value at (step ST24 in FIG. 14).

That is, when the control value $a_{t,v}$ related to the speed of the robot among the control values at for the robot is larger than the speed threshold Thy, the control value correcting unit 15 changes the control value $a_{t,v}$ related to the speed of the robot to equal to or less than the speed threshold Thy.

In addition, when the control value $a_{t,a}$ related to the acceleration of the robot among the control values at for the robot is larger than the acceleration threshold $Th_a$, the control value correcting unit 15 changes the control value $a_{t,a}$ related to the acceleration of the robot to equal to or less than the acceleration threshold $Th_a$.

The control value correcting unit 15 controls the movement of the robot in accordance with a control value $a_t'$ of the robot after the correction processing (step ST24 in FIG. 14).

The control value correcting unit 15 changes each of the control value $a_{t,v}$ related to the speed of the robot and the control value $a_{t,a}$ related to the acceleration of the robot, so that, for example, when the moving route is curved, it is possible to prevent the route deviation due to the excessively high speed of the robot or the like.

In the first embodiment described above, the robot control device 11 is configured to include: the moving route acquiring unit 13 to acquire the movement route of the robot from the first learning model 4, by giving, to the first learning model 4, the observation data indicating the position of the obstacle being present in the region where the robot moves and the state data indicating the moving state of the robot at the movement start point where the robot starts moving among the moving states of the robot in the region where the robot moves; and the control value generating unit 14 to generate the control value for the robot, the control value for allowing the robot to move along the moving route acquired by the moving route acquiring unit 13. Therefore, the robot control device 11 can move the robot without colliding with the obstacle in a region where a position of the obstacle or the like is different from a known region where an obstacle is present.

Second Embodiment

In a second embodiment, the robot control device 11 in which the control value generating unit 14 generates the control value at for the robot without using the second learning model 10 will be described.

The configuration of the robot control device 11 according to the second embodiment is similar to the configuration of the robot control device 11 according to the first embodiment, and a configuration diagram illustrating the robot control device 11 according to the second embodiment is illustrated in FIG. 8. In this regard, the control value generating unit 14 is not provided with the second learning model 10.

The control value generating unit 14 acquires the state data $d_{s,t}$ output from the data acquiring unit 12 and the route data output from the moving route acquiring unit 13.

The control value generating unit 14 calculates, from a position $p_t$ of the robot at the control processing time t indicated by the state data $d_{s,t}$, a direction toward a position $k_{t+1}$ of the robot at the control processing time t+1 indicated by the route data, as a moving direction of the robot.

The control value generating unit 14 outputs the control value indicating the calculated moving direction of the robot, as the control value $a_{t,d}$ related to the moving direction of the robot, to the control value correcting unit 15.

In addition, the control value generating unit 14 outputs, for example, a control value indicating a constant speed, as the control value $a_{t,v}$ related to the speed of the robot, to the control value correcting unit 15. The control value indicating the constant speed may be stored in an internal memory of the control value generating unit 14, or may be given from the outside of the robot control device 11, for example.

In addition, the control value generating unit 14 outputs, for example, a control value indicating an acceleration of zero, as a control value $a_{t,a}$ related to the acceleration of the robot, to the control value correcting unit 15, at points other than the movement start point and the movement end point of the robot.

Also in the robot control device 11 according to the second embodiment, similarly to the robot control device 11 according to the first embodiment, it is possible to move the robot without colliding with an obstacle in a region where a position of the obstacle or the like is different from a known region where an obstacle is present.

The robots according to the first and second embodiments can be used as autonomous traveling type robots. However, this is merely an example, and the robots according to the first and second embodiments can also be used as, for example, a robot arm.

It should be noted that in the present disclosure, it is possible to freely combine the embodiments, modify any component of each embodiment, or omit any component in each embodiment.

INDUSTRIAL APPLICABILITY

The present disclosure is suitable for a robot control device and a robot control method for generating a control value for a robot.

The present disclosure is suitable for a learning model generation device that generates a learning model.

REFERENCE SIGNS LIST

1: learning model generation device, 2: teacher data generating unit, 3, 3': learning model generating unit, 4: first learning model, 5: learning model generation device, 6: teacher data generating unit, 7: learning model generating unit, 8: reward value calculating unit, 9: model generation processing unit, 10: second learning model, 11: robot control device, 12: data acquiring unit, 13: moving route acquiring unit, 14: control value generating unit, 15: control value correcting unit, 21: teacher data generating circuit, 22: learning model generating circuit, 23: teacher data generating circuit, 24: reward value calculating circuit, 25: model generation processing circuit, 31: data acquiring circuit, 32: moving route acquiring circuit, 33: control value generating circuit, 34: control value correcting circuit, 41, 43, 45: memory, 42, 44, 46: processor

The invention claimed is:

1. A robot control device comprising:
a computer processor;
a memory storing instructions executed by the computer processor to
acquire a moving route of a robot from a first learning model, by giving, to the first learning model, observation data indicating a position of an obstacle being present in a region where the robot moves and state data indicating a moving state of the robot at a movement start point where the robot starts moving among moving states of the robot in the region where the robot moves, the first learning model outputting route data including coordinate data of a next position on the moving route to which robot is to move from the movement start point, and
generate at least one control value for the robot, the at least one control value indicating an acceleration by which the robot is to move at a particular time to proceed along the acquired moving route,
wherein the computer processor gives, to a second learning model, state data indicating a moving state of the robot when the robot is moving in the region and the acquired moving route including the route data outputted by the first learning model, and acquires the at least one control value for the robot from the second learning model; and
a controller to control the robot based on the at least one control value.

2. The robot control device according to claim 1, the executed instructions further causing the computer processor to change a control value related to a speed of the robot to equal to or less than a speed threshold when the control value related to the speed of the robot is larger than the speed threshold, and change a control value related to an acceleration of the robot to equal to or less than an acceleration threshold when the control value related to the acceleration of the robot is larger than the acceleration threshold, among control values for the robot acquired from the second learning model.

3. A robot control method comprising:
acquiring, a moving route of a robot from a first learning model, by giving, to the first learning model, observation data indicating a position of an obstacle being present in a region where the robot moves and state data indicating a moving state of the robot at a movement start point where the robot starts moving among moving states of the robot in the region where the robot moves, the first learning model outputting route data including coordinate data of a next position on the moving route to which robot is to move from the movement start point;
generating, at least one control value for the robot, the at least one control value indicating an acceleration by which the robot is to move along the acquired moving route;
giving, to a second learning model, state data indicating a moving state of the robot when the robot is moving in the region and the acquired moving route including the route data outputted by the first learning model, and acquiring the at least control value for the robot from the second learning model; and
controlling the robot based on the at least one control value.

4. A learning model generation device comprising:
a computer processor; and
a memory storing instructions executed by the computer processor to
generate teacher data indicating a route along which a robot can move in each of a plurality of regions without colliding with an obstacle being present in each of the regions;
generate a first learning model that learns a moving route of the robot by using observation data indicating a position of the obstacle being present in each of the plurality of regions, state data indicating a moving state of the robot at a movement start point at which the robot starts moving among moving states of the robot in each of the regions, and the generated teacher data, and outputs moving route data for the robot, when observation data indicating a position of an obstacle being present in a region where the robot moves and state data indicating a moving state of the robot at a movement start point at which the robot starts moving among moving states of the robot in the region where the robot moves are given, the moving route data including coordinate data of a next position on the moving route to which the robot is to move from the movement start point, and
generate a second learning model that
learns a control value for the robot by using state data indicating a moving state of the robot when the robot is moving in each of the regions and the generated teacher data, or the moving route data for the robot output from the first learning model, the control value indicating an acceleration by which the robot is to move; and
outputs the control value to a controller, when state data indicating a moving state of the robot when the robot is moving in a certain region and a moving route of the robot output from the first learning model are given, the controller using the control value to control the at least one of the speed and acceleration by which the robot moves at a particular time to proceed along the moving route.

5. The learning model generation device according to claim 4, wherein
the executed instructions further cause the computer processor to generate a second learning model that
learns a control value for the robot by using the state data indicating the moving state of the robot when the robot is moving in each of the regions and the generated teacher data, and
outputs a control value for the robot, when the state data indicating the moving state of the robot when the robot is moving in the certain region and a moving route of the robot, which is output from a different source than the first learning model, are given.

* * * * *